United States Patent
Barnett et al.

(10) Patent No.: US 7,292,074 B2
(45) Date of Patent: Nov. 6, 2007

(54) WRITE DRIVER WITH CONTINUOUS IMPEDANCE MATCH AND IMPROVED COMMON MODE SYMMETRY

(75) Inventors: Raymond Elijah Barnett, Apple Valley, MN (US); Tuan Van Ngo, Eden Prairie, MN (US)

(73) Assignee: Texas Instruments Incorporated, Dallas, TX (US)

( * ) Notice: Subject to any disclaimer, the term of this patent is extended or adjusted under 35 U.S.C. 154(b) by 272 days.

(21) Appl. No.: 10/753,691

(22) Filed: Jan. 8, 2004

(65) Prior Publication Data

US 2005/0152206 A1   Jul. 14, 2005

(51) Int. Cl.
*G11B 5/02* (2006.01)

(52) U.S. Cl. ............................ 327/110; 360/68; 360/46

(58) Field of Classification Search ................. 360/46, 360/65–68, 25; 327/110, 423
See application file for complete search history.

(56) References Cited

U.S. PATENT DOCUMENTS

| | | | |
|---|---|---|---|
| 6,121,800 A * | 9/2000 | Leighton et al. ............ 327/110 |
| 6,236,246 B1 * | 5/2001 | Leighton et al. ............ 327/110 |
| 6,236,247 B1 * | 5/2001 | Ngo ............................ 327/110 |
| 6,246,533 B1 * | 6/2001 | Davis et al. .................. 360/68 |
| 6,373,298 B1 * | 4/2002 | Teterud et al. .............. 327/110 |
| 6,512,646 B1 * | 1/2003 | Leighton et al. ............. 360/46 |
| 6,683,487 B2 * | 1/2004 | Takeuchi et al. ............ 327/423 |
| 6,879,455 B2 * | 4/2005 | Ngo et al. .................... 360/68 |

* cited by examiner

*Primary Examiner*—Dinh T. Le
(74) *Attorney, Agent, or Firm*—Wade J. Brady, III; Frederick J. Telecky, Jr.

(57) ABSTRACT

The present invention describes a voltage-mode boosting write driver circuit (160), comprising a plurality of inputs (WDP, WDN), a plurality of outputs (HWX, HWY), a transducer (L2), a flex interconnection (T1) coupled to the outputs (HWX, HWY) and to the transducer (L2), a first resistor (R15) and a second resistor (R43) coupled to the outputs (HWX, HWY) and to the transducer (L2), an H-switch (Q15, Q60, Q11, Q22) coupled to the resistors (R15, R43), and a plurality of top boosting circuits (Q42, Q47, R36, and Q43, Q48, R37) coupled to the outputs (HWX, HWY).

5 Claims, 4 Drawing Sheets

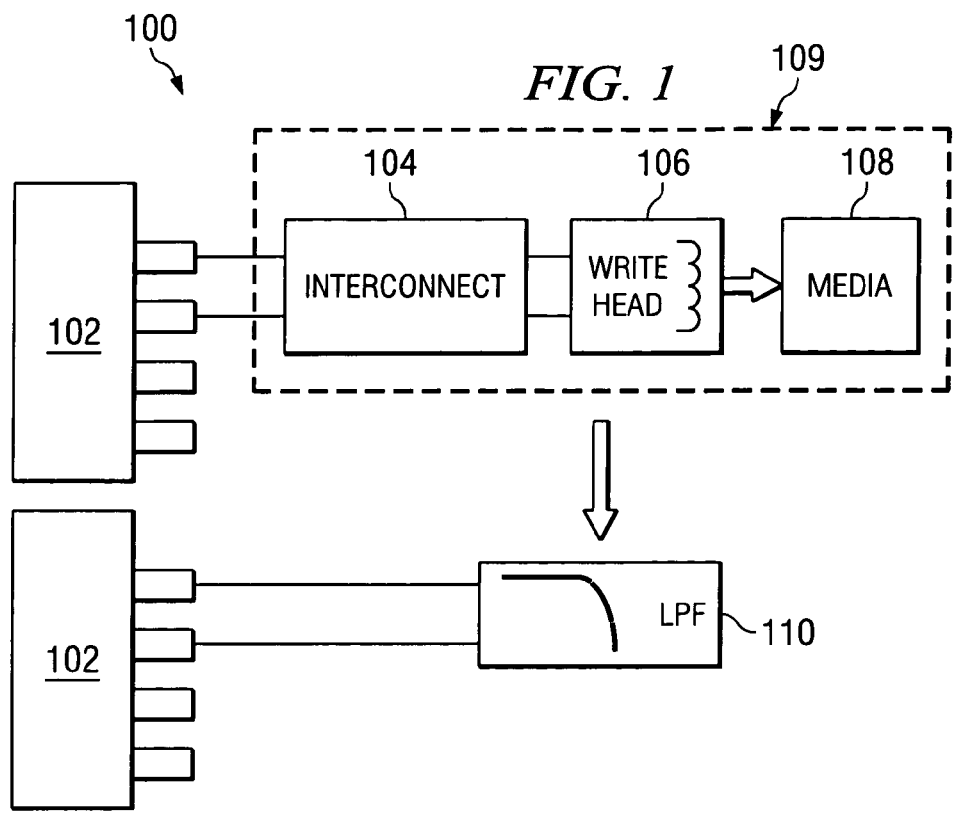
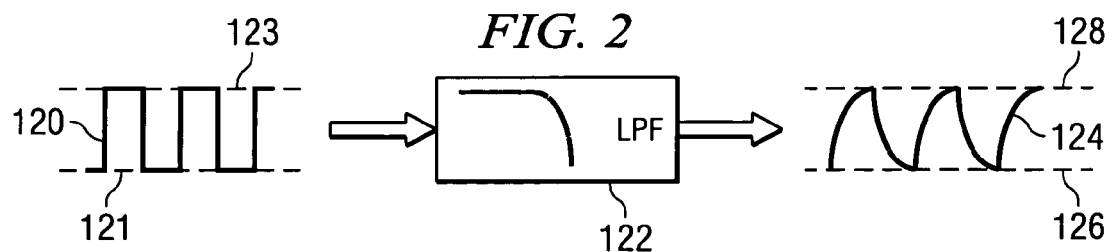
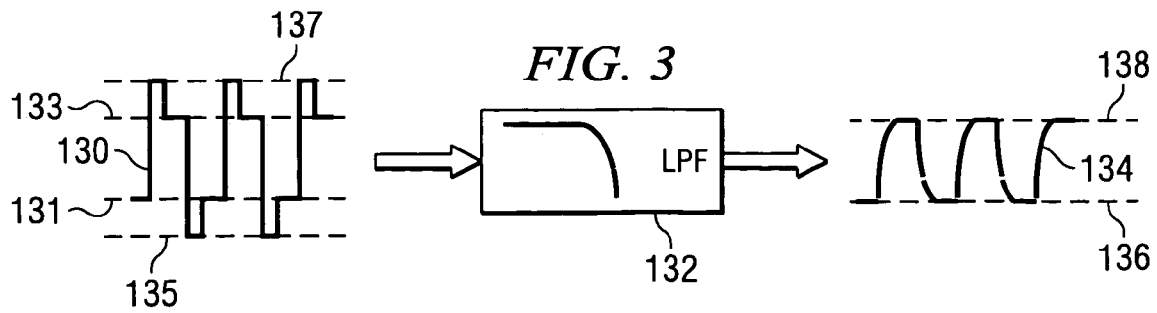

WRITE DRIVER WITH CONTINUOUS IMPEDANCE MATCH AND IMPROVED COMMON MODE SYMMETRY

CROSS REFERENCE TO RELATED APPLICATION

The present invention is related to published U.S. patent application 2003/0076613 A1, assigned to the assignee of the present invention, and is incorporated by reference herein.

FIELD OF THE INVENTION

The present invention relates to inductive line drivers and, more particularly, to a write driver with continuous impedance match and improved common mode symmetry.

BACKGROUND OF THE INVENTION

The interconnecting leads between preamplifiers and read/write heads in hard disk drive devices are spaced very close together, often within a few mils of each other. The read sensors consist of very sensitive magnetoresistive material that cannot tolerate excessive voltages. In contrast, the write element consists of a thin-film inductor which requires large sub-nanosecond voltage swings for high data rate systems. Because of the close spacing of the writer and the reader, an asymmetrical voltage swing provided to the write head can couple into and damage the adjacent read element.

Prior art apparatuses for use in applying write signals for driving a write head to effect writing information to a memory device, such as write driver preamplifiers, are often not designed to effect symmetrical voltage swing during the write current reversal period. Write current reversal is commonly employed to differentiate between digital symbols (e.g., a "1" and a "0") in writing information to a memory device. Any voltage asymmetry in carrying out write current reversal will result in energy coupling into the adjacent reader(s), and can damage or destroy the sensitive read element(s). Read elements and write elements are commonly situated in very close proximity in read/write heads associated with storage mediums such as hard disk drive devices.

The coupling current can be modeled to first order by:

$$I = C\frac{dV}{dt} \quad (1)$$

Where, C is the average capacitance from the writer to the reader, dV is the asymmetrical voltage, and dt is the net change in time.

From Eqn. (1) one can observe that the coupling current will increase when the spacing between traces is decreased ((i.e., when capacitance is increased), when the writer voltage is asymmetric (i.e., when dV is increased), or when the switching speed is increased (i.e., when dt is decreased).

Such prior art apparatuses further attempt to provide symmetrical voltage swing by biasing the common-mode write voltage about mid supply for a single write digital-to-analog converter (DAC) setting. Therefore, the writer's output common-mode will vary with the programmed write current and the writer's voltage swing will be symmetric for only one programmed setting. Further limitations of these prior art apparatuses include difficulty in providing continuous transient impedance matching at all frequencies of the preamplifier's output impedance to the external interconnection (flex) impedance. Therefore, these apparatuses have difficulty in enhancing the write driver performance over a wide range of operational data rates.

It is therefore desirable for the present invention to overcome the aforementioned problems and limitations associated with the prior art apparatuses that apply write signals to drive a write head for writing information to a memory device.

SUMMARY OF THE INVENTION

The present invention achieves technical advantages as a write driver with continuous flex impedance match and improved common mode output symmetry over a wide range of write current. This will reduce the common mode voltage coupling from the writer to the read head to prevent any damage to the fragile read head, especially with the very thin layer new TMR read head. As a result, very high data rate write driver operating at >2 Gb/s is achieved with less damage to the read element due to the writer's high speed large voltage coupling.

The present invention uses push-pull voltage follower to keep the output transistor on during transient switching and uses a small current, which is proportional to the output write current, to drop the common mode output voltage over a wide range of operational data rate (from DC to >2 Gb/s).

In one embodiment of the present invention, a voltage-mode boosting write driver circuit comprises a plurality of inputs, a plurality of outputs, a transducer, a flex interconnection coupled to the outputs and to the transducer, a first resistor and a second resistor coupled to the outputs and to the transducer, an H-switch coupled to the resistors, and a plurality of top boosting circuits coupled to the outputs.

In another embodiment of the present invention, a method for providing common mode symmetry in a write driver circuit comprises setting a write data signal at a potential, conducting, by a plurality of transistors, based on the potential, flowing, by a write current, from a positive voltage supply to a negative voltage supply via a transistor, a flex impedance matched resistor, a flex interconnection, a thin film transducer, the flex interconnection, one of the plurality of transistors, a resistor, and a negative voltage supply, and flowing, to another transistor, a small current from another one of the plurality of transistors.

BRIEF DESCRIPTION OF THE DRAWINGS

FIG. 1 is a schematic diagram illustrating modeling of a thin film inductive write driver system as a low pass filter in accordance with an exemplary embodiment of the present invention;

FIG. 2 is a schematic diagram illustrating how a low pass filter affects traversing signals in accordance with an exemplary embodiment of the present invention;

FIG. 3 is a schematic diagram illustrating how a signal overshoot affects the operation of a low pass filter in accordance with an exemplary embodiment of the present invention;

DETAILED DESCRIPTION OF THE INVENTION

Figure 4:
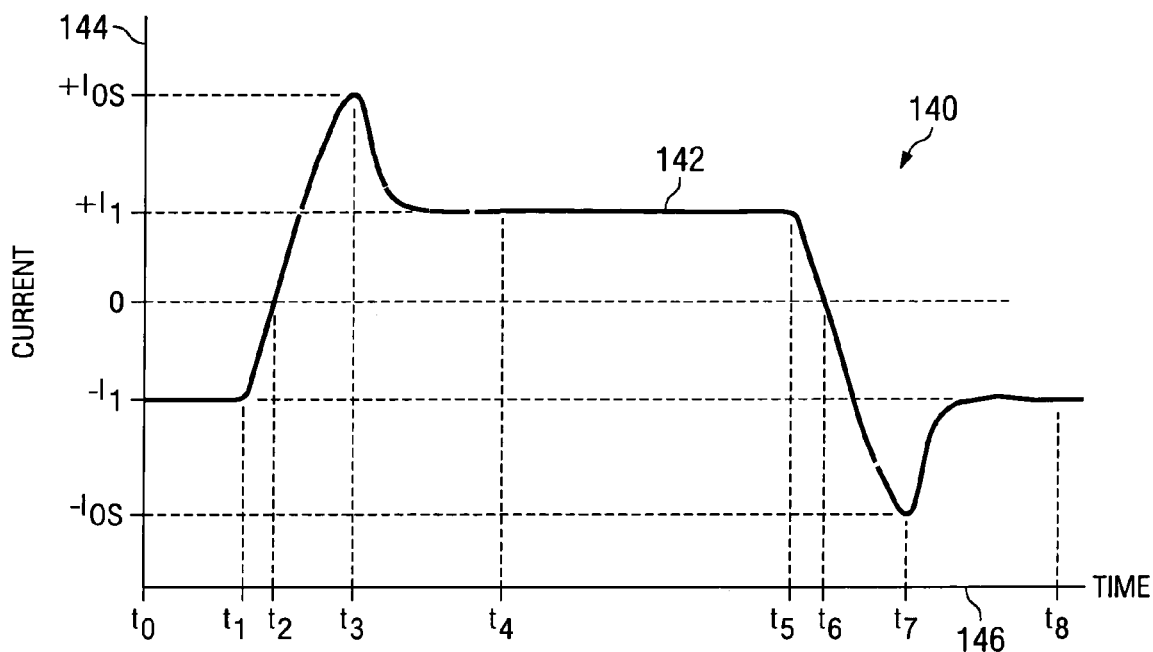
FIG. 4 is a graphic plot illustrating a desired write current waveform as a function of time in accordance with an exemplary embodiment of the present invention.

FIG. 1 is a schematic diagram illustrating modeling of a thin film inductive write driver system as a low pass filter. In FIG. 1, a write driver system 100 includes a preamplifier 102 coupled with an interconnect structure 104. Interconnect structure 104 typically includes lead wires extending from preamplifier 102 along an extended arm reaching adjacent a magnetic storage disk (not shown in FIG. 1) to a write head 106. Write head 106 is typically suspended on the extended arm that supports interconnect structure 104 in close proximity with media 108. Media 108 is typically a magnetic storage disk.

Components contained within dotted line box 109 may be modeled as a low pass filter (LPF) 110 coupled with preamplifier 102. Low pass filter 110 is configured to pass signals having frequencies below a predetermined frequency value and inhibit passing of signals having frequencies above the predetermined frequency value.

FIG. 2 is a schematic diagram illustrating how a low pass filter affects traversing signals. In FIG. 2, an input signal 120 is input to a low pass filter 122. Input signal 120 varies between an input signal minimum 121 and an input signal maximum 123. Low pass filter 122 presents an output signal 124. Output signal 124 has a relatively slow rise time from output signal minimum 126 and output signal maximum 128. Similarly, output signal 124 has a relatively slow fall time from output signal maximum 128 to output signal minimum 126. Slow rising and falling result in transitions or excursions of output signal 124 between output signal minimum 126 and output signal maximum 128 occupying longer time intervals than would be the case if rise times and fall times were shorter. If signal transitions or excursions occurred more quickly, more data could be transferred in a given time interval than can be transferred when rise times and fall times are slower.

FIG. 3 is a schematic diagram illustrating how a signal overshoot affects the operation of a low pass filter. In FIG. 3, an input signal 130 is input to a low pass filter 132. An overshoot characteristic is introduced to input signal 130 so that input signal 130 varies between an input signal minimum 135 and an input signal maximum 137. Input signal limits 135, 137 are beyond the nominal signal limits 131, 133 that would be associated with input signal 130 without an overshoot characteristic imposed. Low pass filter 132 presents an output signal 134. Output signal 134 has a relatively faster rise time (compared with rise time for output signal 124; FIG. 2) from output signal minimum 136 and output signal maximum 138. Similarly, output signal 134 has a relatively faster fall time (compared with rise time for output signal 124; FIG. 2) from output signal maximum 138 to output signal minimum 136. Faster rising and falling times result in transitions or excursions of output signal 134 between output signal minimum 136 and output signal maximum 138 occupying shorter time intervals. Because signal transitions or excursions occur more quickly, more data can be transferred in a given time interval than can be transferred when rise times and fall times are slower.

Faster rising and falling of signals to a write head in a storage system is manifested in increased density of stored bits. Write systems therefore preferably provide current overshoot characteristics to aid in quickly reversing current direction through a write head to reverse flux direction intersected by the storage medium (e.g., a magnetic disk) for writing information to the storage medium (e.g., "1"s and "0"s). Providing current overshoot characteristics also sharpens transition edges, thereby permitting reliable increased density writing of information to the storage medium.

FIG. 4 is a graphic plot illustrating a desired write current waveform as a function of time. In FIG. 4, a graphic plot 140 presents a curve 142 representing current through a write head is plotted according to a first (current) axis 144 as a function of time according to a second axis 146. Curve 142 begins at a time to at a current level of $-I_1$. Current level $-I_1$ is a current level that indicates a digital character (e.g., a "1" or a "0") for storage in a medium such as a magnetic storage disk (not shown in FIG. 4). At a time $t_1$ curve 142 increases and passes zero at a time $t_2$. Curve 142 continues to increase until it reaches a value of $+I_{OS}$ at a time $t_3$. Current level $+I_{OS}$ is the positive overshoot current limit or peak overshoot of curve 142. Curve 142 rapidly declines in value after time $t_3$ and approaches a current level $+I_1$. Curve 142 settles out at current level $+I_1$ substantially at time $t_4$. Current level $+I_1$ is a current level that indicates a digital character (e.g., a "1" or a "0") for storage in a medium such as a magnetic storage disk (not shown in FIG. 4). At time $t_5$ curve 142 decreases and passes zero at a time $t_6$. Curve 142 continues to decrease until it reaches a value of $-I_{OS}$ at a time $t_7$. Current level $-Ios$ is the negative overshoot current limit or peak undershoot of curve 142. Curve 142 rapidly increases in value after time $t_7$ and approaches a current level $-I_1$. Curve 142 settles out at current level $-I_1$ substantially at time $t_8$. Preferably curve is symmetrical so that there is no net positive or negative current. That is, preferably magnitude $|+I_{os}|$ is equal with magnitude $|+I_{os}|$, and interval $(t_1-t_4)$ is equal with interval $(t_5-t_8)$.

Figure 5:
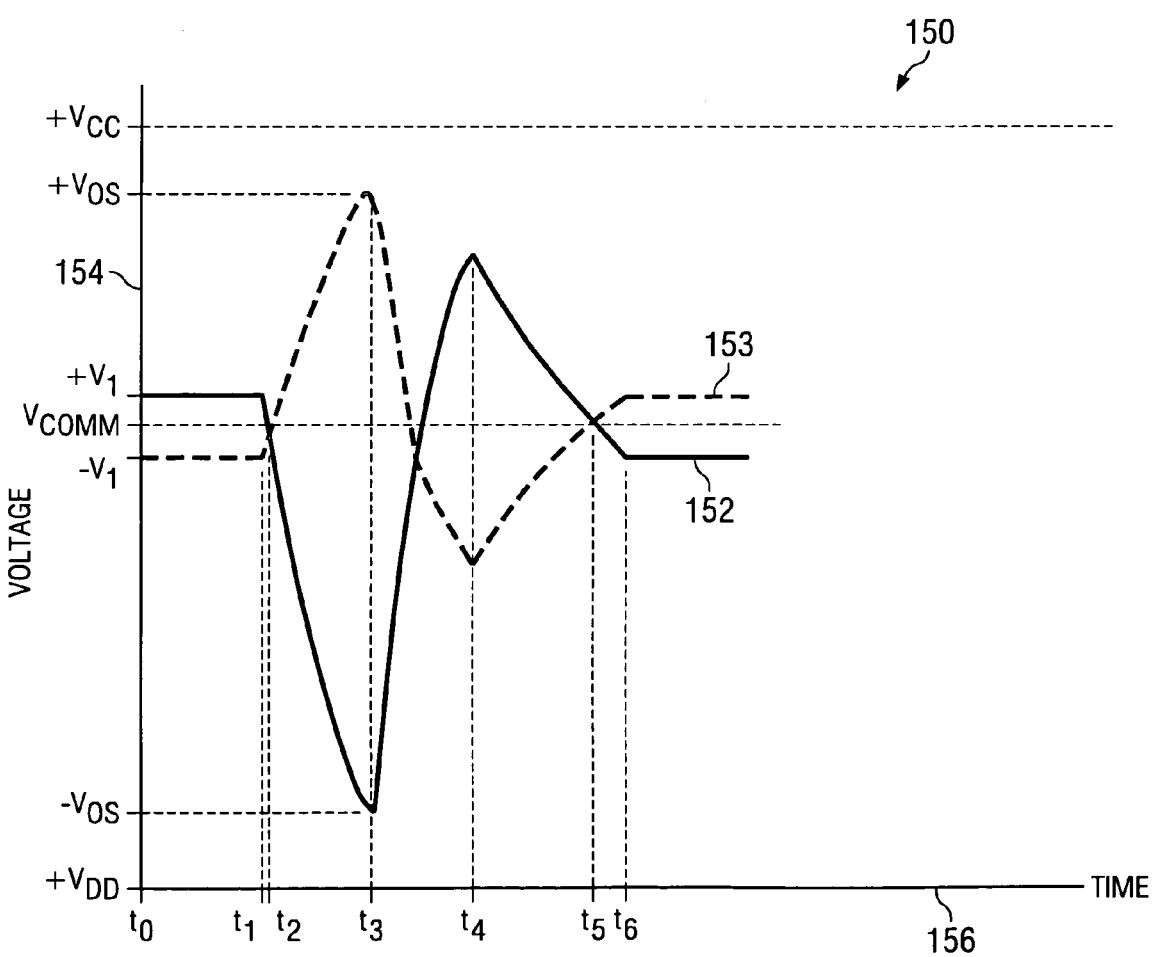
FIG. 5 is a graphic plot illustrating voltage characteristics across a write head as a function of time that are appropriate for presenting the desired current waveform illustrated in FIG. 4 in accordance with an exemplary embodiment of the present invention.

FIG. 5 is a graphic plot illustrating voltage characteristics across a write head as a function of time that are appropriate for presenting the desired current waveform illustrated in FIG. 4. In FIG. 5, a graphic plot 150 presents curves 152, 153 representing voltages present at respective connection terminals of a write head that provide the desired write currents (e.g., curve 140; FIG. 4). Curves 152, 153 are plotted according to a first (voltage) axis 154 as a function of time according to a second axis 156. Curve 152 represents voltage present at a first terminal of a write head and begins at a time $t_0$ at a voltage level of $+V_1$. Curve 153 represents voltage present at a second terminal of the write head and begins at a time $t_0$ at a voltage level of $-V_1$. Curves 152, 153 represent voltage potentials at each of two ends of a write head that cooperate to establish a current through the write head (e.g., curve 140; FIG. 4). At a time $t_1$ curve 152 decreases and passes the common-mode point at a time $t_2$. At a time $t_1$ curve 153 increases and passes the common-mode point at time $t_2$. Polarity of the current through the write head is determined by polarities of voltages at terminals of the write head. Thus, current through the write head will proceed in a first direction (i.e., have a first polarity) when curve 152 is at potential $+V_1$ and curve 153 is at potential $-V_1$ as during the interval to $t_0-t_2$. The relative polarities of curves 152, 153 during interval to $t_0-t_2$ will produce a write current, for example, of $-11$ as indicated during interval to $t_0-t_1$ in FIG. 4.

Curve 152 continues to decrease until it reaches a value of $-V_{OS}$ at a time $t_3$. Curve 153 continues to increase until it reaches a value of $+Vos$ at time $t_3$. Voltage level $-V_{OS}$ is the negative overshoot voltage limit of curve 152. Voltage level $+V_{OS}$ is the positive overshoot voltage limit of curve 153. During the interval $t_2$-$t_3$ current (e.g., curve 140; FIG. 4) through the write head approaches zero and reaches zero at time $t_3$. Curve 152 rapidly increases in value after time $t_3$ and reaches a maximum excursion locus at time $t_4$. Curve 153 decreases in value after time $t_3$ and reaches a minimum excursion locus at time $t_4$. Current through the write head has passed its peak overshoot current limit (either $+1_{OS}$ or $-I_{OS}$), depending upon the relative polarities of curves 152, 153) during the interval $t_3$-$t_4$.

Curve 152 decreases after time $t_4$ and settles out at voltage $-V_1$ at time $t_6$. Curve 153 increases after time $t_4$ and settles out at voltage $+V_1$ at time $t_6$. Peak undershoot of current through the write head occurs at time $t_5$ when curves 152, 153 cross. Current through the write head during interval to $t_0$-$t_1$ flows in the opposite direction of current through the write head following time $t_6$ because the relative polarities of curves 152, 153 are reversed during those times.

During interval $t_0$-$t_1$, and after time $t_6$ curves 152, 153 are substantially symmetrical about a common mode voltage $V_{comm}$. It is preferred that voltage represented by curve 152 ($V_{152}$) and voltage represented by curve 153 ($V_{153}$) be symmetrical about common mode voltage $V_{COMM}$ so that preferably magnitude $|V_{152}|$ is equal with magnitude $|V_{153}|$ in any selected time interval. When such symmetry is achieved, coupling between components in a write system (e.g., coupling with adjacent read elements) may be reduced.

Sometimes a system is skewed toward the top rail (also referred to as upper supply voltage; e.g., VCC in FIG. 5) or toward the bottom rail (also referred to as lower supply voltage; e.g., $V_{EE}$ in FIG. 5) and "runs out of room" in its signal variance while seeking desired symmetry. This sometimes occurs because common mode voltage $V_{COMM}$ (i.e., the common voltage about which the signal variations are desired to be symmetrical) is too high or too low. When common mode voltage $V_{COMM}$ is too close to the top rail, for example, a system may tend to generate voltages that encounter the top rail, limiting the magnitude of signal excursion in the positive direction (while not affecting signal excursions in the negative direction), thereby experiencing asymmetry. Similarly, one may find that common mode voltage $V_{COMM}$ is skewed toward a lower value so that a system tends to generate voltages that encounter the bottom rail and thereby experience asymmetry.

A manufacturer of a preamplifier for use with a read-write storage system (e.g., a magnetic disk storage system) preferably designs a preamplifier that can accommodate a variety of operating conditions and parameters that may be presented by different system designs by different customers. Accordingly it is advantageous for a given preamplifier design to have programmable bottom end characteristics—such as programmable magnitude and programmable duration of boost or overshoot toward a negative direction for a voltage waveform for a writer head. Similarly, it is advantageous for a given preamplifier to have programmable top end characteristics—such as programmable magnitude and programmable duration of boost or overshoot toward a positive direction for a voltage waveform for a writer head. Having both top and bottom boost or overshoot programmable permits a preamplifier to accommodate a wide range of operating characteristics that may be encountered in various storage systems in which the preamplifier may be employed. In order to design a device that can be used with a variety of products for a variety of customers, it is advantageous for a system to provide some adjustability to a customer in designing what value is assigned for common mode voltage $V_{COMM}$. It is advantageous for a system to provide a capability to adjust the value of common mode voltage $V_{COMM}$ to permit a designer to ensure that sufficient room is left to avoid crowding the top rail or the bottom rail during operation.

Circuit Description

Figure 6A:
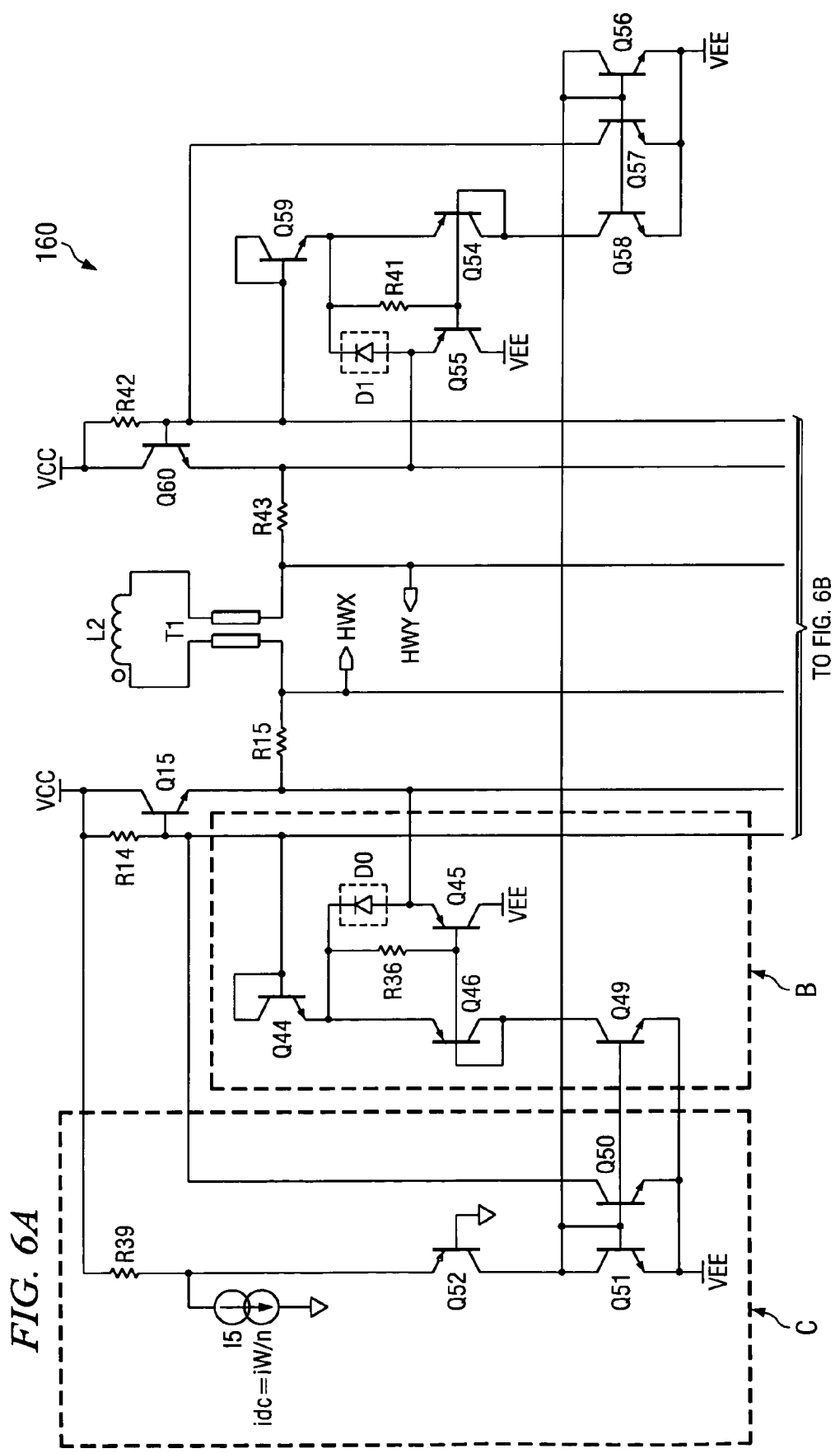
FIG. 6 is a schematic diagram illustrating a write driver circuit in accordance with an exemplary embodiment of the present invention.
Figure 6B:
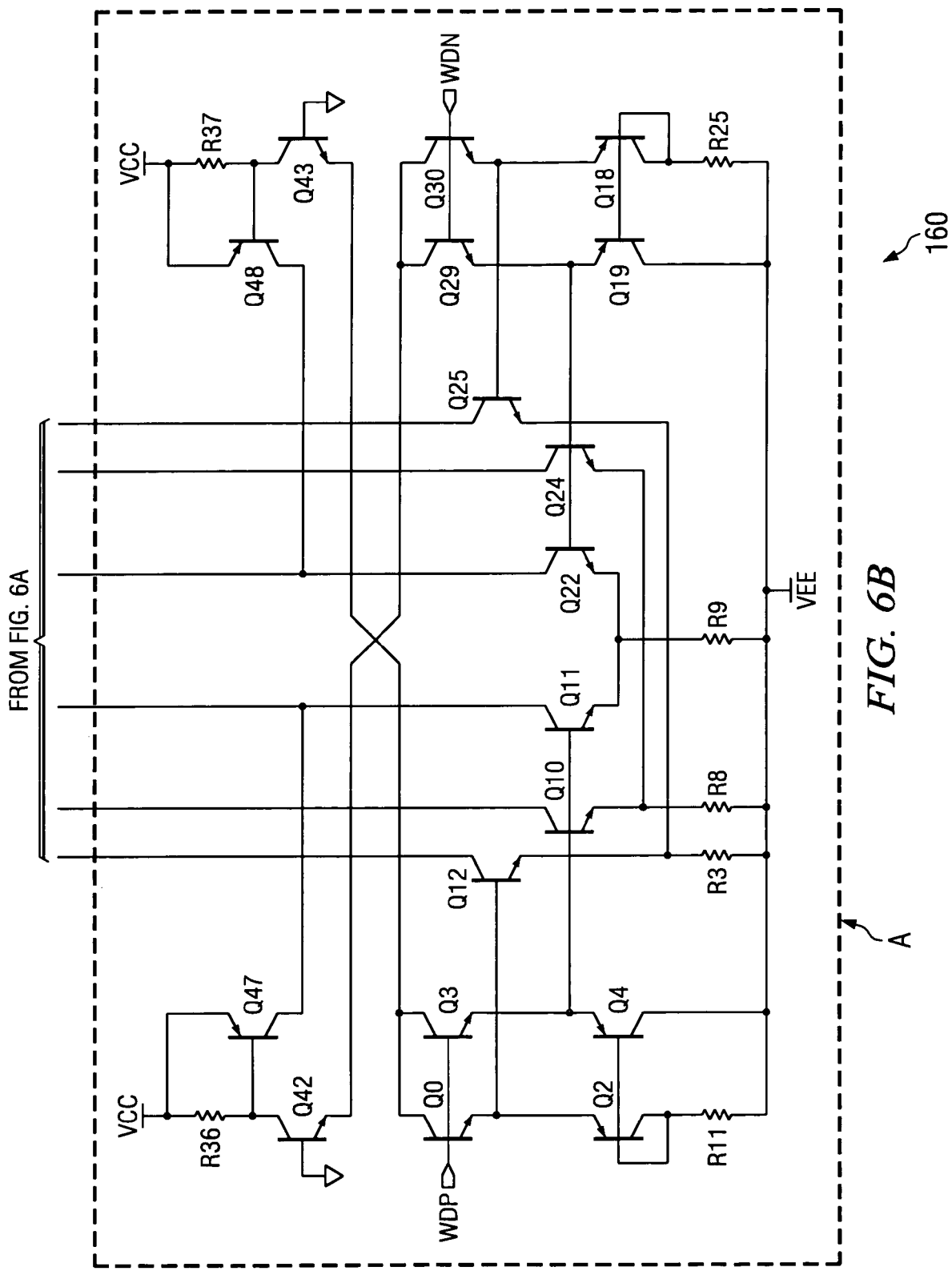

FIG. 6 depicts a voltage-mode boosting write driver circuit 160 according to a preferred embodiment of the present invention. The inputs of the write driver circuit are the differential write data signals WDP and WDN. The differential outputs of the circuit are HWX and HWY, which drive the flex interconnection T1, connected to the thin film transducer L2. The main H-switch switches the write current IW and is composed of an upper pair of bipolar transistors Q15 and Q60, and a lower pair of bipolar transistors Q11 and Q22. Resistors R15 and R43 are impedance-matched resistors which together match the differential impedance of the interconnection T1. A further description of the circuit in ellipse A can be found in published U.S. patent application 2003/0076613 A1 which is incorporated by reference herein.

Transistor Q10 will provide additional drive to pull down the voltage at the emitter of Q15 in order to increase the speed with which the voltage transitions from high to low at circuit node HWX. Transistor Q24 will provide additional drive to pull down the voltage at the emitter of Q60 in order to increase the speed with which the voltage transitions from high to low at circuit node HWY.

Each side of the write drive circuit includes a top boosting circuit. The top boosting circuit for the left side of the write driver circuit consists of the transistors Q42 and Q47 and resistor R36. This circuit will increase the speed with which the voltage transitions from low to high at circuit node HWX. Likewise, the top boosting circuit for the right side of the write driver circuit consists of the transistors Q43 and Q48 and resistor R37. This circuit will increase the speed with which the voltage transitions from low to high at circuit node HWY.

Transistors Q0, Q2, Q3, and Q4, provide input buffering so that the ECL signal at input WDP is able to drive the switching transistors. This input buffer circuit is duplicated for right side input signal WDN, and for this input the buffer circuit is composed of transistors Q18, Q19, Q29, and Q30.

The continuous flex impedance match circuit is shown within Ellipse B, and consists of transistors Q44-Q46, Q49, resistor R35, and diode D0. This circuit is connected between the base and emitter of the upper H-switch transistor Q15. The continuous flex impedance match circuit implements a push-pull voltage follower to keep the output transistor Q15 on at all times during switching transients. In the embodiment described herein, the impedance matching circuit of Ellipse B is duplicated for the right side of this circuit. The right side impedance matching circuit is composed of transistors Q54, Q55, Q58, Q59, resistor R41, and diode D1. This circuit is connected between the base and emitter of the upper H-switch transistor Q60.

The circuit in Ellipse C achieves common-mode output voltage symmetry with the ability of self-adjusting to write current amplitude. This circuit consists of current source I5, resistor R39, and a current mirror made by transistors Q50-Q52. The current mirror is also used by the right side of the switching circuit, where transistors Q56 and Q57 are connected similarly to the transistors Q50 and Q51 that are present in the left side of the switching circuit.

Circuit Operation

The main H-switch switches the write current IW and is composed of an upper pair of bipolar transistors Q15 and Q60, and a lower pair of bipolar transistors Q11 and Q22. Resistors R15 and R43 are impedance matched resistors and which together match the differential impedance of the interconnection T1.

Assume write data signal WDP is at a high potential and write data signal WDN is at a low potential. For this condition, transistors Q10, Q11 and Q12 are conducting while transistors Q22, Q24, and Q25 are nonconductive. Write current IW flows from the positive voltage supply Vcc to the collector of transistor Q60, from the emitter of Q60 to the flex impedance matched resistor R43, through the flex interconnection T1 and the thin film transducer L2, through the flex interconnection T1 and through the collector and emitter of Q11, and through resistor R9 to the negative voltage supply Vee. Transistor Q15 will be kept on by a small current from the collector of transistor Q10. The conditions described will result in a DC matched impedance with the differential impedance looking into the preamplifiers of HWX and HWY.

Likewise, when write data signal WDN is at a high potential and write data signal WDP is at a low potential, transistors Q22, Q24, and Q25 are conducting while transistors Q10, Q11 and Q12 are nonconductive. Write current IW flows from the positive voltage supply Vcc to the collector of transistor Q15, from the emitter of Q15 to the flex impedance matched resistor R15, through the flex interconnection T1 and the thin film transducer L2, through the flex interconnection T1 and through the collector and emitter of Q22, and through resistor R9 to the negative voltage supply Vee. Transistor Q60 will be kept on by a small current from the collector of transistor Q24. The conditions described will result in a DC matched impedance with the differential impedance looking into the preamplifiers of HWX and HWY.

For each of the cases described above, the value of the DC matched impedance is approximately equal to R15+R43. Due to the impedance matching effect of the H-switch resistors R15 and R43, the write current IW settles very quickly and with minimum ringing, thereby allowing the write circuit to achieve a high data rate.

The top boosting circuit composed of transistors Q43 and Q48 and resistor R37 will increase the speed that the voltage at circuit node HWY can be changed from a low voltage to a high voltage. The top boosting circuit composed of transistors Q42 and Q47 and resistor R38 will increase the speed that the voltage at circuit node HWX can be changed from a low voltage to a high voltage.

Ellipse B

Due to the effects of the data write frequency and the impedance characteristics of the flex element T1, a switching transient may result in a reflected wave coming back to the preamplifier that brings the potential of the emitter of Q15 high which will act to render transistor Q15 nonconducting. When transistor Q15 is nonconducting, only half of the circuit will be impedance matched. This will cause the impedance matching network to lose its effect. In order to match impedance more correctly, a continuous flex impedance match circuit is implemented using a class AB push-pull voltage follower circuit consisting of transistors Q15, Q44, Q45, and Q46. The input to the voltage follower circuit is at the base of transistor Q15 and the output of the voltage follower is at the emitter of Q15. This voltage follower circuit will act to ensure that the base-emitter voltage of Q15 is kept constant in order to keep transistor Q15 on during switching transients. Resistor R35 and Schottky diode D0 are used to keep the junction breakdown of transistor Q15 within limits during times when the writer circuitry is powered down. This powered down condition does not occur during write operation and resistor R35 and diode D0 are not effective during write operation.

In the embodiment described herein, the impedance matching circuit of Ellipse B is duplicated for the symmetrical half of this circuit, as depicted in FIG. 1. This symmetric impedance matching circuit is composed of transistors Q54, Q55, Q59, Q60, resistor R41, and diode D1. The operation of this circuit is identical to that of the circuit of Ellipse B.

Ellipse C

In order to improve the symmetry of the common-mode output voltage between the circuit nodes HWX and HWY, the circuit shown in Ellipse C is implemented to reduce the common-mode voltage. The circuit is self-adjusted to the wide range of write current, which typically ranges from 10 mA to 50 mA. This self-adjustment is provided by current source I5, which supplies a current that is proportional to the write current IW. For example, if write current IW is 50 mA then current I5 is 2 mA, or IW=25*I5.

The current through current source I5 flows to the emitter of transistor Q52, where it is added to the emitter current of Q52 and then flows through Q52 and into the current mirror comprised of reference transistors Q51 and Q56 and mirror transistors Q50, and Q57. The total current through the reference transistors Q51 and Q56 comprises the reference current for the current mirror transistors Q50 and Q57. The current mirror creates proportional mirror currents through the collector of Q50 and the collector of Q57. These two currents are added to the base currents of transistors Q15 and Q60, causing the base potentials of Q15 and Q60 to be simultaneously reduced by a specific amount. This decrease in the base potentials of transistors Q15 and Q60 will act to reduce the common mode voltage at the circuit nodes HWX and HWY. The common mode voltage at the circuit nodes HWX and HWY can be adjusted by varying the current through current source I5, by varying the ratio of the current mirrors, or by simultaneously varying both the current through I5 and the ratio of the current mirrors. By adjusting the common-mode output voltage to a voltage halfway between the positive supply voltage Vcc and the negative supply voltage Vee, the best possible common-mode symmetry is achieved.

What is claimed is:

1. A write driver, comprising:
   (a) an H-switch;
   (b) a first impedance-matching resistor coupled between a first transistor of said H-switch and a first load output of said H-switch; and
   (c) a first continuous impedance-matching circuit coupled to the base and the emitter of said first transistor;
   (d) wherein said first continuous impedance-matching circuit maintains said first transistor conductive during switching transients of said H-switch and thereby maintains said first impedance-matching resistor for impedance matching at said first load output.

2. The write driver of claim 1, wherein said first transistor is a bipolar transistor, said first continuous impedance-matching circuit is a push-pull voltage follower with input at said base of said first transistor and with output at said emitter of said first transistor, and said first impedance-matching resistor connects between said emitter and said first load output.

3. The write driver of claim 2, further comprising a common-mode voltage circuit, said common-mode voltage circuit is a current source which feeds current to said base of said first transistor, whereby common-mode voltage (during intervals between said switching transients) at said first load output is adjustable.

4. The write driver of claim 1, wherein said H-switch includes (i) said first transistor as an npn with collector connected to Vcc and emitter connected to said first impedance-matching resistor, (ii) a second npn transistor with collector connected to said Vcc and emitter connected to a second impedance-matching resistor, (iii) a second load output connected to said second impedance-matching resistor, (iv) a third npn transistor with collector connected to said first impedance-matching resistor and emitter coupled to Vee, (v) a fourth npn transistor with collector connected to said second impedance-matching resistor and emitter coupled to said Vee, and (vi) a second continuous impedance-matching circuit connected to said second transistor.

5. A write driver, comprising:
(a) an H-switch;
(b) first and second impedance-matching resistors coupled first and second load outputs of said H-switch;
(c) wherein said H-switch includes (i) a first npn transistor with collector connected to Vcc and emitter connected to said first impedance-matching resistor, (ii) a second npn transistor with collector connected to said Vcc and emitter connected to said second impedance-matching resistor, (iii) a third npn transistor with collector connected to said first impedance-matching resistor and emitter coupled to Vee, (iv) a fourth npn transistor with collector connected to said second impedance-matching resistor and emitter coupled to said Vee, and
(d) a common-mode voltage circuit, said common-mode voltage circuit is a current source which feeds current to a base of said first transistor, whereby common-mode voltage at said first and second load outputs is adjustable during intervals between switching transients.

* * * * *